(12) United States Patent
Kitajima

(10) Patent No.: US 8,867,098 B2
(45) Date of Patent: Oct. 21, 2014

(54) RECORDING APPARATUS HAVING DATA CONCEALMENT PROCESSING FUNCTION

(71) Applicant: Tetsuya Kitajima, Nagoya (JP)

(72) Inventor: Tetsuya Kitajima, Nagoya (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/041,345

(22) Filed: Sep. 30, 2013

(65) Prior Publication Data

US 2014/0185066 A1 Jul. 3, 2014

(30) Foreign Application Priority Data

Dec. 28, 2012 (JP) .................................. 2012-288320

(51) Int. Cl.
*G06K 1/00* (2006.01)
*G06K 15/02* (2006.01)
*H04N 1/60* (2006.01)

(52) U.S. Cl.
CPC ........... *G06K 15/1867* (2013.01); *Y10S 347/90* (2013.01)
USPC ............. 358/1.9; 358/1.1; 358/1.13; 358/2.1; 399/38; 428/64.4; 428/195.1; 347/900; 347/111; 347/110

(58) Field of Classification Search
None
See application file for complete search history.

(56) References Cited

U.S. PATENT DOCUMENTS

2009/0066987 A1* 3/2009 Inokuchi ....................... 358/1.13
2010/0238512 A1* 9/2010 Kimura ......................... 358/3.24

FOREIGN PATENT DOCUMENTS

JP 2009-089362 A 4/2009

* cited by examiner

*Primary Examiner* — Quang N Vo
(74) *Attorney, Agent, or Firm* — Scully, Scott, Murphy & Presser, P.C.

(57) ABSTRACT

When executed by a controller of recording apparatus, the instructions causes the recording apparatus to perform: calculating at least one of a first recording ratio and a second recording ratio based on an image data of an image recorded on a recording medium; controlling a depositing device of recording apparatus to perform a concealment process when at least one condition is satisfied, the at least one condition including a condition that the at least one of the first recording ratio and the second recording ratio is smaller than a threshold value; and controlling the depositing device not to perform the concealment process when the at least one of the first recording ratio and the second recording ratio is greater than or equal to the threshold value.

15 Claims, 9 Drawing Sheets

Tetsuya

FIG. 7B

IchTetsuyakuo

FIG. 8 company limited

RECORDING APPARATUS HAVING DATA CONCEALMENT PROCESSING FUNCTION

CROSS REFERENCE TO RELATED APPLICATIONS

This application claims priority from Japanese Patent Application No. 2012-288320 filed Dec. 28, 2012. The entire content of the priority application is incorporated herein by reference.

TECHNICAL FIELD

The invention relates to a recording apparatus having a data concealment processing function and a storage medium storing a data concealment processing program used for the recording apparatus.

BACKGROUND

Recently, there is increasing awareness of preventing leakage of information such as personal information, and technology is disclosed that a concealing image is formed to overlap information recorded on an original document so that the printed image is difficult to read.

On the other hand, with increasing awareness of environment, technology has been widely used that paper on which an image is formed is recovered and the recovered paper is recycled as recycled paper.

SUMMARY

When a concealing image is formed to overlap confidential information recorded on paper, a larger amount of recording material such as ink could be used for forming the concealing image. Such paper cannot be recycled as recycled paper. Thus, if such paper is mixed with other recyclable paper, the entire bundle of paper is disposed regardless of a fact that recyclable paper is included in the bundle of paper.

In view of the foregoing, the invention provides a recording apparatus. The recording apparatus includes a conveying-path defining member, an image reader, a depositing device, a controller and a memory. The member defines a conveying path along which a recording medium is conveyed. The image reader is provided to face the conveying path and configured to read image data of an image recorded on the recording medium. The depositing device is provided to face the conveying path at a downstream side of the image reader in the conveying path. The depositing device is configured to deposit recording material on the recording medium. The controller is configured to control the image reader and the depositing device. The first memory stores a predetermined threshold value. The second memory stores instructions. When executed by the controller, the instructions causes the recording apparatus to perform: calculating at least one of a first recording ratio and a second recording ratio based on the image data based on the image read by the image reader, the first recording ratio being an occupancy ratio of an area of recording material forming the image to a surface area of the recording medium, the second recording ratio being the occupancy ratio assuming that the recording material is deposited as a result of a concealment process based on the image data read by the image reader, the concealment process being a process of depositing the recording material over at least part of the image recorded on the recording medium; comparing at least one of the first recording ratio and the second recording ratio with the threshold value; controlling the depositing device to perform the concealment process when at least one condition is satisfied, the at least one condition including a condition that the at least one of the first recording ratio and the second recording ratio is smaller than the threshold value; and controlling the depositing device not to perform the concealment process when the at least one of the first recording ratio and the second recording ratio is greater than or equal to the threshold value.

According to another aspect, the invention also provides a storage medium storing a set of program instructions. When executed by a controller of a recording apparatus, causing the controller to perform: calculating at least one of a first recording ratio and a second recording ratio based on image data based on an image read by an image reader of the recording apparatus, the first recording ratio being an occupancy ratio of an area of recording material forming the image to a surface area of the recording medium, the second recording ratio being the occupancy ratio assuming that the recording material is deposited as a result of a concealment process based on the image data, the concealment process being a process of depositing the recording material over at least part of the image recorded on the recording medium; comparing at least one of the first recording ratio and the second recording ratio with a threshold value; controlling a depositing device of the recording apparatus to perform the concealment process when at least one condition is satisfied, the at least one condition including a condition that the at least one of the first recording ratio and the second recording ratio is smaller than the threshold value; and controlling the depositing device not to perform the concealment process when the at least one of the first recording ratio and the second recording ratio is greater than or equal to the threshold value.

According to still another aspect, the invention also provides a method of concealing an image recorded on a recording medium. The method comprising: calculating at least one of a first recording ratio and a second recording ratio based on image data based on an image read by an image reader of a recording apparatus, the first recording ratio being an occupancy ratio of an area of recording material forming the image to a surface area of the recording medium, the second recording ratio being the occupancy ratio assuming that the recording material is deposited as a result of a concealment process based on the image data, the concealment process being a process of depositing the recording material over at least part of the image recorded on the recording medium; comparing at least one of the first recording ratio and the second recording ratio with a threshold value; controlling a depositing device of the recording apparatus to perform the concealment process when at least one condition is satisfied, the at least one condition including a condition that the at least one of the first recording ratio and the second recording ratio is smaller than the threshold value; and controlling the depositing device not to perform the concealment process when the at least one of the first recording ratio and the second recording ratio is greater than or equal to the threshold value.

BRIEF DESCRIPTION OF THE DRAWINGS

Embodiments in accordance with the invention will be described in detail with reference to the following figures wherein:

FIG. 6A shows a post code, and FIG. 6B shows the post code subsequent to a concealment process;

FIG. 7A shows a personal name, and FIG. 7B shows the personal name subsequent to the concealment process;

FIG. 8 shows character recorded in a typeface other than Times New Roman typeface or Arial typeface;

DETAILED DESCRIPTION

Figure 1:
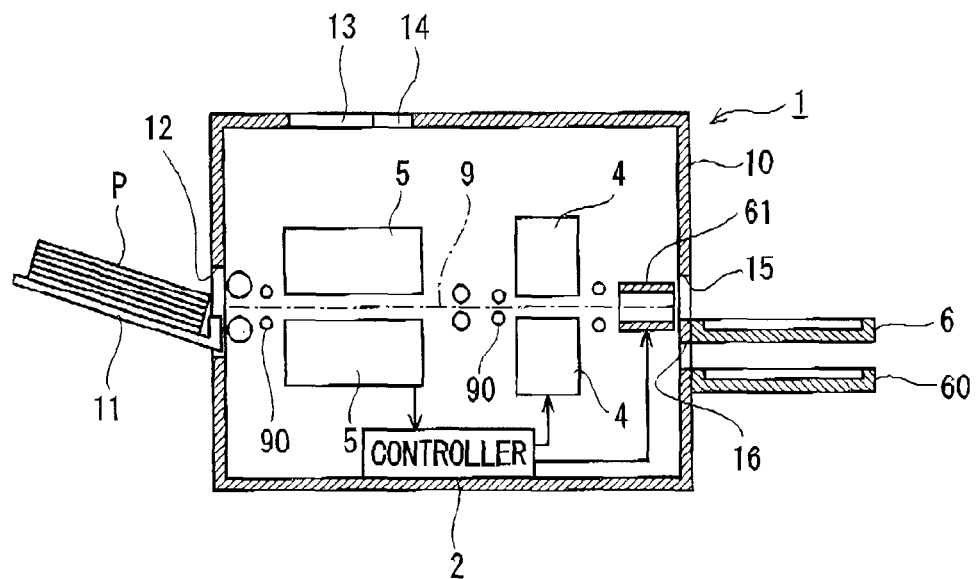
FIG. 1 is a schematic view showing the overall configuration of a recording apparatus according to an embodiment of the invention.

Hereinafter, embodiments of the invention will be described while referring to the accompanying drawings wherein like parts and components are designated by the same reference numerals to avoid duplicating description.

<Overall Configuration of Recording Apparatus>

As shown in FIG. 1, a recording apparatus 1 has a rectangular-parallelepiped casing 10. A paper feeding tray 11 for accommodating paper P on which an image is formed is provided at one side of the casing 10. A surface of the paper P on which an image is recorded is referred to as a recording surface. The paper P in the paper feeding tray 11 passes through an opening 12 and enters the casing 10. The opening 12 is formed at the side of the casing 10 to confront the paper feeding tray 11.

Within the casing 10, a plurality of pairs of conveying rollers 90 is arranged in a horizontal direction, and is configured to convey the paper P horizontally. That is, a conveying path 9 along which the paper P is conveyed is formed by the plurality of pairs of conveying rollers 90.

Within the casing 10, two image readers 5 are provided to confront each other with the conveying path 9 interposed therebetween. Each image reader 5 reads image recorded on the recording surface of the paper P. Character is illustrated as an example of image to be read in the present embodiment. Here, the character includes alphabet and alphabet characters as well as numbers and various symbols.

At a downstream side of the image reader 5 in the conveying path 9 within the casing 10, two depositing devices 4 are provided to confront each other with the conveying path 9 interposed therebetween. The depositing devices 4 deposit recording material on the paper P so as to record information. In the present embodiment, the depositing devices 4 are recording heads that eject ink, which is an example of recording material, on the recording surface of the paper P. That is, character is formed with dots of ink. Thick (dark) character is formed with large dots, whereas thin (light) character is formed with small dots. However, the depositing device 4 may be a device that transfers color particles as used in laser printers. As will be described later, the depositing device 4 deposits the printing material over character that is recorded on the recording surface of the paper P, thereby concealing confidential information included in the character. In the following description, a process of depositing the printing material over character is referred to as a concealment process.

A guide mechanism 61 for guiding the paper P is swingably provided at a downstream side of the depositing devices 4 in the conveying path 9 within the casing 10. Outside the casing 10, a first tray 6 for accommodating the paper P and a second tray 60 located at the lower side of the first tray 6 are provided. At a side of the casing 10, openings 15 and 16 are formed to face the both trays 6 and 60, respectively. The guide mechanism 61 selectively guides the conveyed paper P to one of the trays 6 and 60 through the openings 15 and 16, respectively. As will be described later, the first tray 6 accommodates the paper P on which the concealment process is performed, and the second tray 60 accommodates the paper P on which the concealment process is not performed.

A display 13 and a touch panel 14 are provided on a top surface of the casing 10. The display 13 displays predetermined information relating to the concealment process. A user inputs operation information through the touch panel 14.

The reason why the two image reader 5 are provided with the conveying path 9 interposed therebetween is, when character are recorded on both sides of the paper P, for reading the character on the both sides of the paper P. Accordingly, if character is recorded only on one side of the paper P, only one image reader 5 may be provided to confront the one side of the paper P. In this case, only one depositing device 4 may be provided to confront the one side of the paper P, like the image reader 5.

A controller 2 is provided at a position within the casing 10 that does not hinder conveyance of the paper P. The controller 2 controls operations of the image readers 5, the depositing devices 4, and the guide mechanism 61. Although the controller 2 includes a single CPU in the present embodiment, the controller 2 may be constituted by a combination of a plurality of CPUs. Or, the controller 2 may be constituted by an ASIC (Application Specific Integrated Circuit), or may be constituted by a combination of one or more CPU and ASIC. Also, the functions of the controller 2 may be executed by software, hardware, or a combination of software and hardware.

Figure 2:
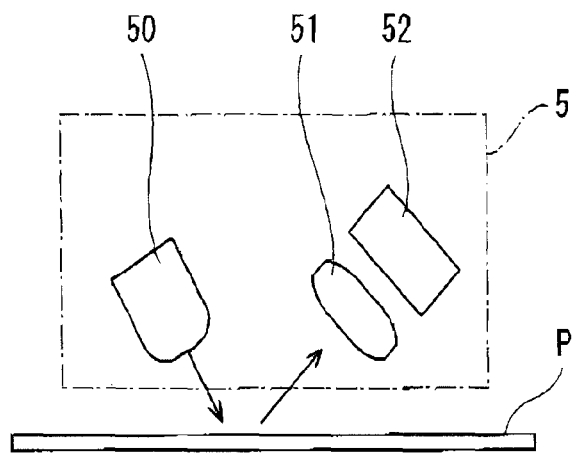
FIG. 2 is a schematic view showing the internal configuration of an image reader.

As shown in FIG. 2, the image reader 5 includes a light emitting element 50, a condensing lens 51, and an image sensor 52. The light emitting element 50 emits light to the recording surface of the paper P. The condensing lens 51 condenses light that is reflected on the recording surface. The image sensor 52 reads character on the recording surface via the condensing lens 51. Although the image sensor 52 is constituted by a line CCD having predetermined resolution, the image sensor 52 may be constituted by a CMOS or the like.

Figure 3A:
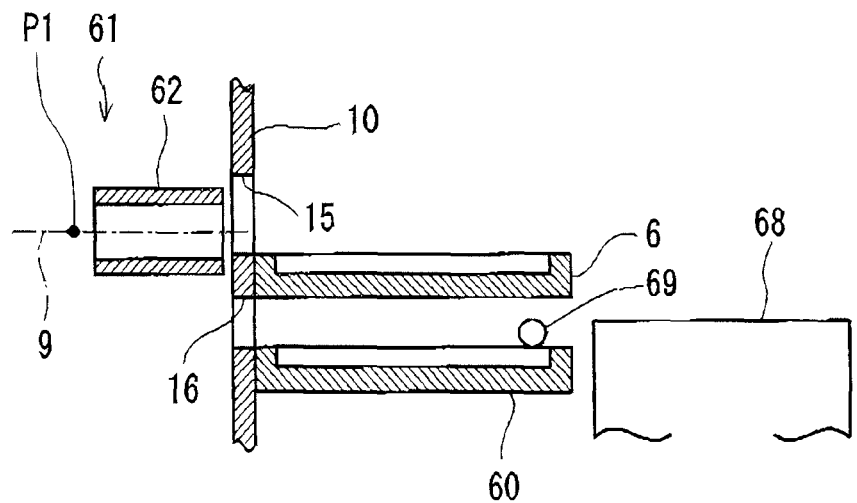
FIGS. 3A and 3B are cross-sectional views showing an operation of a guide mechanism.
Figure 3B:
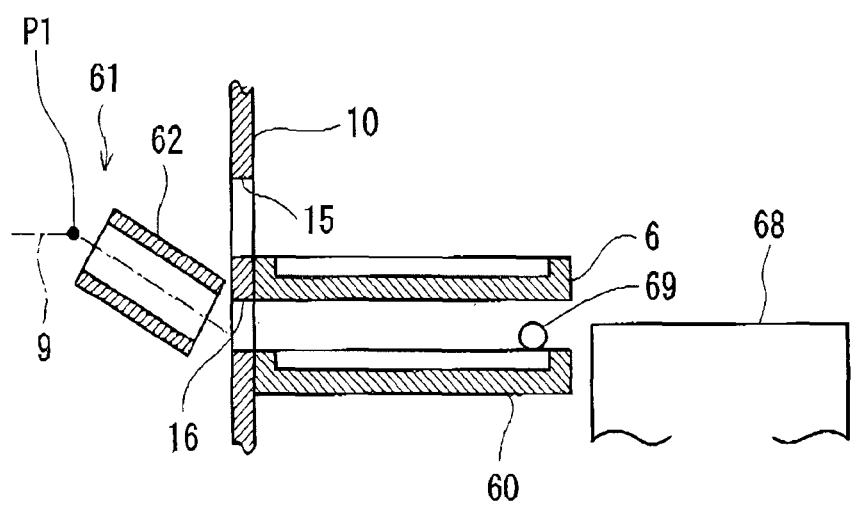

As shown in FIGS. 3A and 3B, the guide mechanism 61 includes a tube body 62 that is swingably moved about an imaginary point P1 within the casing 10, and the paper P passes inside the tube body 62. The tube body 62 is swingably moved by a motor (not shown) about the imaginary point P1. The motor is controlled by the controller 2.

When the paper P is accommodated in the first tray 6, as shown in FIG. 3A, the tube body 62 is substantially in a horizontal state, so that the paper P is guided to the first tray 6 via the opening 15. When the paper P accommodated in the second tray 60, as shown in FIG. 3B, the tube body 62 is swingably moved downward about the imaginary point P1, so that the paper P is guided to the second tray 60 via the opening 16.

Figure 4:
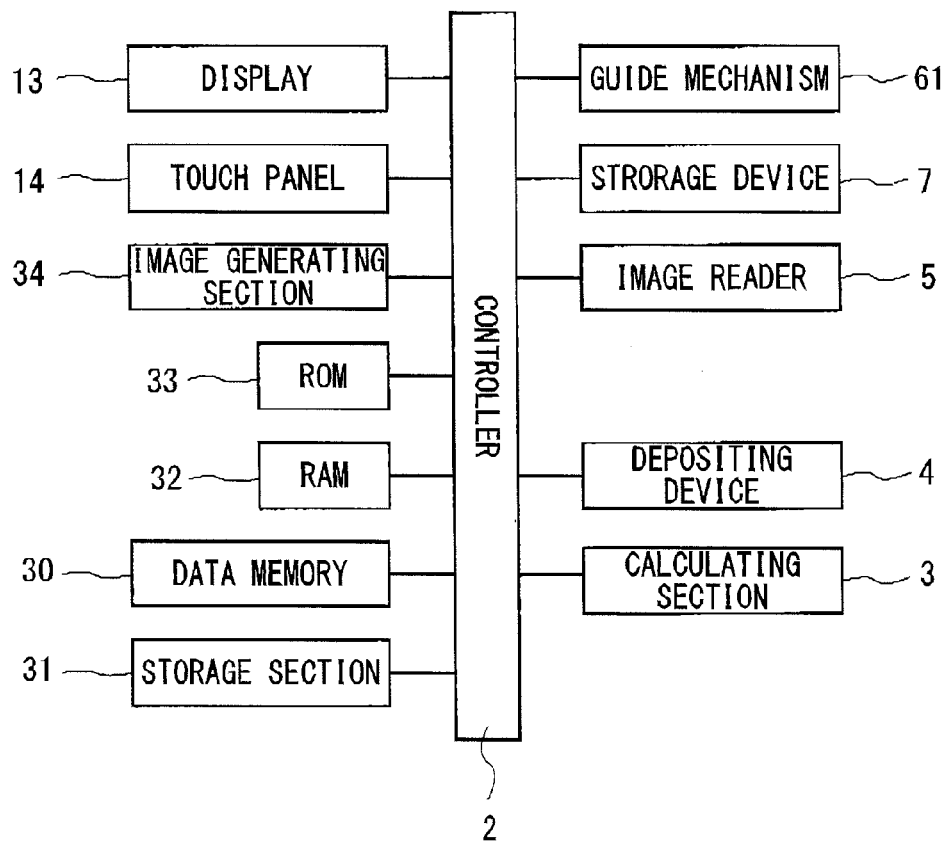
FIG. 4 is a block diagram showing the configuration of a controller and connected parts.

As shown in FIG. 4, the controller 2 is connected to the above-described depositing devices 4, the display 13, the touch panel 14, the guide mechanism 61, the image reader 5, as well as a ROM 33, a RAM 32, a data memory 30, a calculating section 3, a storage device 7, an image generating section 34, and a storage section 31. The ROM 33 stores a system program for governing the overall operations of the recording apparatus 1. The RAM 32 serves as a work memory that temporarily stores information. The data memory 30 temporarily stores character data based on the character that is read by the image reader 5. The storage device 7 stores various dictionaries and the like described later. The image generating section 34 forms character used for the concealment process. The storage section 31 is a nonvolatile memory.

The controller 2 deciphers character from an image read by the image reader 5, by using the OCR (Optical Character Reader) technique. The calculating section 3 calculates a recording ratio based on the character data based on the character that is read by the image reader 5 and the controller 2.

Here, the recording ratio is an occupancy ratio of the character to a surface area of the recording surface and is, for example, a value obtained by dividing a total area of ink dots forming character by the surface area of the recording surface. Accordingly, the recording ratio is larger when the total area of ink dots is larger, and the recording ratio is smaller when the total area of ink dots is smaller.

Character may be recorded on one side of the paper P or may be recorded on both sides of the paper P. In the present embodiment, the recording ratio is a value obtained by dividing a total area of ink dots forming character of the both sides of the paper P by the sum of surface area of both recording surfaces.

In a modification, assuming that character are recorded on one side of the paper P, the recording ratio may be obtained by dividing a total area of ink dots forming character of the one side of the paper P by the surface area of one recording surface.

The calculated recording ratio is temporarily stored in the RAM 32. The storage section 31 stores a threshold value for the recording ratio.

The controller 2 determines whether the recording ratio in the RAM 32 is smaller than the threshold value or is greater than or equal to the threshold value. If the recording ratio is greater than or equal to the threshold value, it is determined that the paper P is not suitable for recycling as recycled paper because of a large amount of ink ejected to the recording surface of the paper P for recording character. If the recording ratio is smaller than the threshold value, it is determined that the paper P is suitable for recycling as recycled paper because of a small amount of ink ejected to the recording surface of the paper P for recording character.

Out of confidential information included in character, there is a large demand of concealing personal information for identifying a person. Accordingly, in the following description, personal information is illustrated as an example of confidential information to be concealed. In other words, the recording apparatus 1 can determine personal information out of character data based on the character recorded on recording surface, and can conceal only the personal information.

Figure 5:
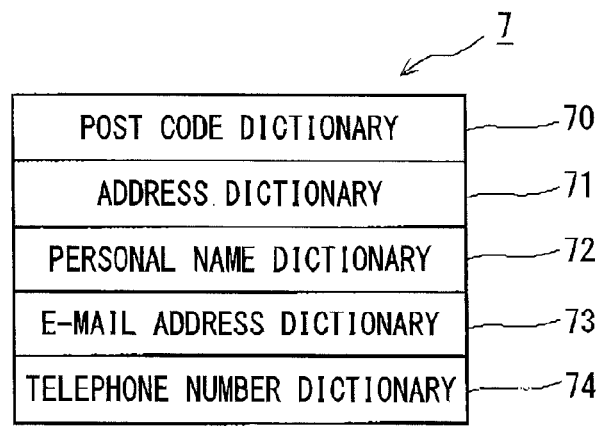
FIG. 5 is an explanatory diagram showing the internal configuration of a storage device.

The storage device 7 stores various dictionaries including concealment data relating to concealment character corresponding to post codes, addresses, personal names, electronic-mail addresses, and telephone numbers that are examples of personal information. As shown in FIG. 5, the various dictionaries include a post code dictionary 70, an address dictionary 71, a personal name dictionary 72, an E-mail address dictionary 73, and a telephone number dictionary 74. The post code dictionary 70 stores a large number of data corresponding to a post code that includes a postal mark "〒" at the beginning and a string of numbers after the postal mark. However, depending on countries, the post code may be a string of a predetermined number of digits (for example, 5-digits). In this case, the post code dictionary 70 stores post code data in such a format without a postal mark. The address dictionary 71 stores a large number of various place-name data beginning with a prefectural name and a municipal name. The personal name dictionary 72 stores a large number of family-name and personal-name data that correspond to a family name and a personal name of a natural person. The E-mail address dictionary 73 stores a large number of alphabetical data including @ mark that corresponds to E-mail addresses. The telephone number dictionary 74 stores a large number of numerical data beginning with an existing local office number or area code that corresponds to telephone numbers. Data in each dictionary is stored with a typeface of Times New Roman typeface or Arial typeface. This is because these typefaces are commonly used for recording on the recording surface of the paper P.

The above-described kinds of various dictionaries in the storage device 7 are merely examples, and dictionaries other than the above-mentioned dictionaries such as post code etc. may be provided. Further, confidential information to be concealed is not limited to personal information. For example, if the paper P is a quotation or the like, a string of numbers beginning with "¥" (Japanese Yen) mark is recorded on the recording surface of the paper P, so as to show a price. There is a case in which such string of numbers is required to be concealed. In this case, a dictionary for prices may be provided in the storage device 7.

In the present embodiment, the ROM 33 (an example of a first memory) stores the system program for governing the overall operations of the recording apparatus 1. The storage section 31 (an example of a second memory) stores the threshold value for the recording ratio. The storage device 7 (an example of a third memory) stores the various dictionaries. In a modification, the system program, the threshold value and the various dictionaries may be stored in different areas in same memory.

The controller 2 compares character read by the image reader 5 with concealment character in the various dictionaries. If the character matches data in one of the various dictionaries, the controller 2 reads out data that is randomly selected from the same dictionary. Next, the controller 2 controls the depositing devices 4 to print the selected data over the character so that the character becomes difficult to read. For example, as shown in FIG. 6A, assume that the character read by the image reader 5 includes a post code "〒467-8562". Because data corresponding to the post code is stored in the post code dictionary 70, the controller 2 randomly selects concealment character from the post code dictionary 70. Here, a post code data "〒789-1234" is read out, and this concealment character is printed over the original character. At this time, the controller 2 uses the image generating section 34 to form the concealment character such that the concealment character is shifted from the original character in a line direction which is a direction in which a character string of the original character is arranged. If the concealment character is printed over the original character, as shown in FIG. 6B, the original character "〒467-8562" becomes difficult to read. This is an example of the concealment process in the present embodiment.

As shown in FIG. 7A, assume that character read by the image reader 5 includes a Japanese male name "Tetsuya".

Because data corresponding to the name exists in the personal name dictionary 72, the controller 2 randomly selects data from the personal name dictionary 72. Here, the controller 2 reads out a male name "Ichiro" and a female name "Ikuko", uses the image generating section 34 to generate concealment character by shifting the data in the line direction, and prints the generated data over the original character. As shown in FIG. 7B, the original character "Tetsuya" becomes difficult to read. In this way, a plurality of concealment character may be read out from one dictionary and be printed over the original character.

If character read by the image reader 5 includes a prefectural name "Hyogo Prefecture" or a municipal name "Osaka City", for example, the controller 2 determines that a character string beginning with such a prefectural name and municipal name is an address, and reads out concealment address data from the address dictionary 71.

If character read by the image reader 5 includes an E-mail address or a telephone number, the controller 2 reads out concealment character from the E-mail address dictionary 73 or the telephone number dictionary 74, respectively, and prints the concealment character over the character.

As described above, data in the dictionaries are stored in Times New Roman typeface or Arial typeface. Thus, as shown in FIG. 8, if the typeface of character is other than Times New Roman typeface or Arial typeface, no corresponding concealment character exists in the dictionaries. In this case, the controller 2 controls the depositing device 4 to paint out the character with ink ejected from the depositing device 4. This region painted out with ink is determined by the image generating section 34. Preferably, the color of ink is a color having low lightness, such as black, that makes original character difficult to read.

Figure 9A:
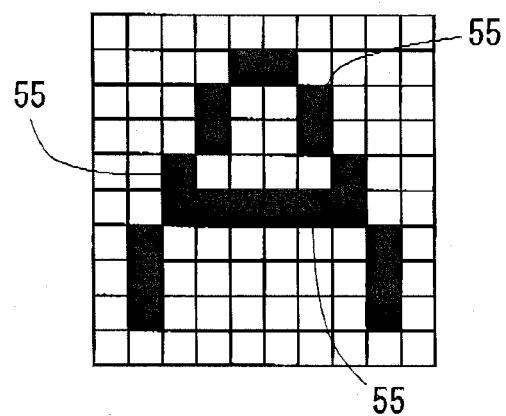
FIGS. 9A and 9B are explanatory views showing an expansion process.
Figure 9B:
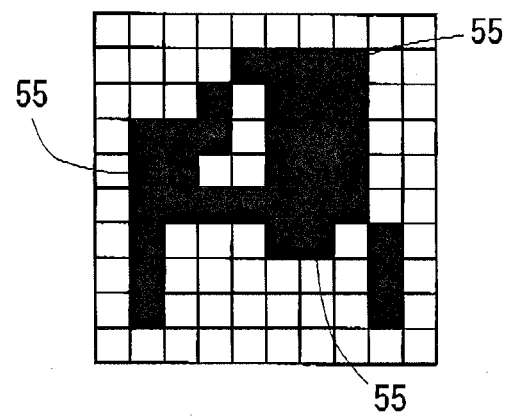

As a method of the concealment process, concealment character may be created by performing an expansion process on character read by the image reader 5 and stored in the data memory 30, and the created concealment character may be printed over original character. The expansion process is a process of changing surrounding pixels to an ejection subject of ink, the surrounding pixels being pixels located around pixels of each character constituting character. Specifically, as shown in FIG. 9A, when character to be concealed is an binary image indicative of a alphabet character "A", specific pixels 55 constituting "A" are randomly extracted. Next, as shown in FIG. 9B, the image generating section 34 paints the pixels 55 located around each pixel 55, and creates concealment character including these pixels 55. The created concealment character is printed over the character "A" of the original character. In this way, creation of the concealment character is performed by the image generating section 34.

Procedure for Determining Whether Paper is to be Recycled

First Embodiment

Paper P on which a large amount of ink is already ejected cannot be recycled as recycled paper. Thus, such paper P needs to be excluded from a subject of recycling, without determining whether the concealment process is to be performed.

Figure 10:
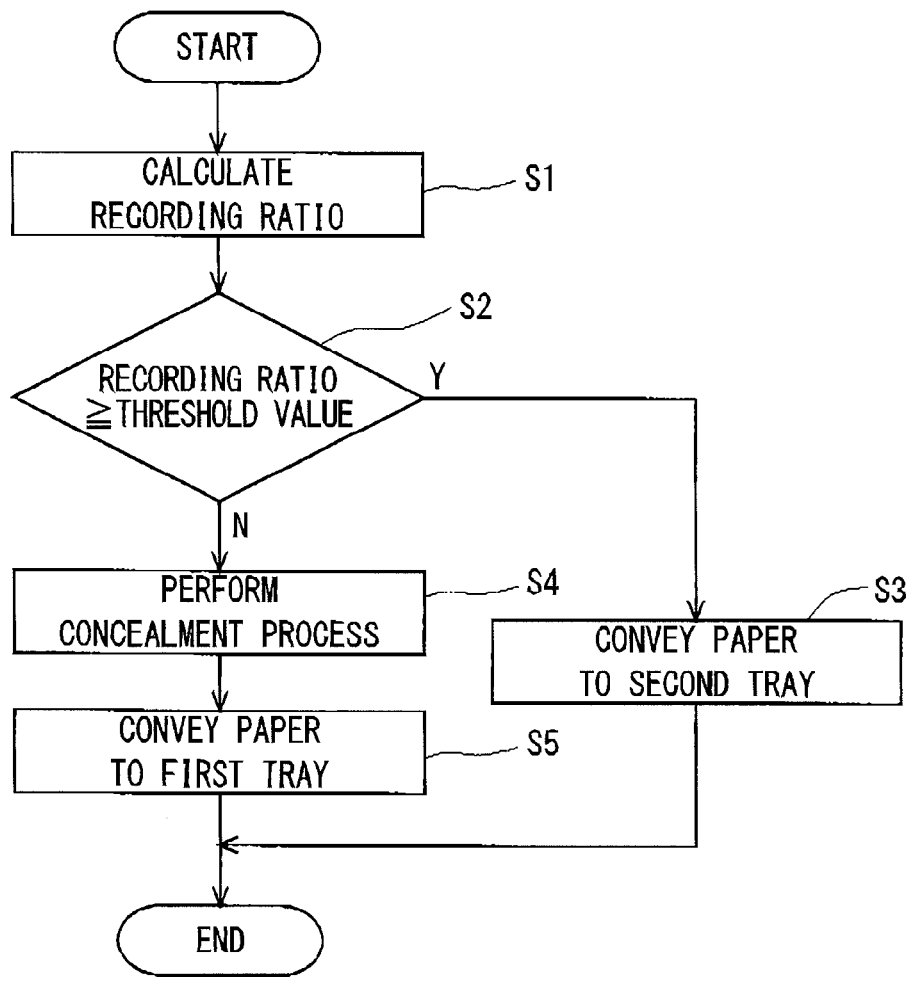
FIG. 10 is a flowchart showing the procedure for determining whether paper should be recycled, according to a first embodiment.

As shown in FIG. 10, in the present embodiment, it is possible to easily exclude paper P that has a large recording ratio and that cannot be recycled.

In a state where the paper feeding tray 11 accommodates paper P on which character is recorded, the user turns ON the power of the casing 10. The pairs of conveying rollers 90 rotate to convey paper P toward the image reader 5 one sheet at a time. An image of character read by the image reader 5 is temporarily stored in the data memory 30.

The calculating section 3 obtains the total area of ink dots constituting character from an image of character in the data memory 30, and divides the total area of ink dots by the surface area of the recording surface, thereby calculating a recording ratio (S1). The recording ratio is temporarily stored in the RAM 32.

The controller 2 compares the recording ratio with a threshold value stored in the storage section 31 (S2). If the recording ratio is greater than or equal to the threshold value, it is inappropriate to recycle the paper P as recycled paper, as described above. Thus, it is inappropriate to perform the concealment process. The controller 2 drives the guide mechanism 61 to convey the paper P to the second tray 60, without driving the depositing devices 4, that is, without performing the concealment process (S3).

In S2, if the recording ratio is smaller than the threshold value, the controller 2 drives the depositing device 4 to eject ink over character on the paper P, thereby performing the concealment process (S4). The concealment process will be described later in greater detail. Subsequently, the controller 2 drives the guide mechanism 61 to convey the paper P to the first tray 6 (S5). With this operation, personal information is concealed, while easily excluding unrecyclable paper P.

Second Embodiment

When concealment character is printed over character, a large amount of ink is required for forming the concealment character in some cases. Because paper P on which a large amount of ink is ejected cannot be recycled as recycled paper, such paper P needs to be excluded from a subject of recycling. On the other hand, if a small amount of ink is used for forming concealment character on paper P, it is also preferable that the paper P on which ink is ejected be efficiently recycled from a viewpoint of environment protection.

In the present embodiment, it is determined whether paper P is recyclable, by comparing recording ratios prior to and subsequent to a concealment process with a threshold value. In the first embodiment, paper P that is originally unrecyclable is excluded. In the present embodiment, it is determined whether paper P subsequent to the concealment process is recyclable. That is, because it is strictly determined whether paper P is recyclable in the present embodiment, the threshold value in the present embodiment is smaller than or equal to the threshold value in the first embodiment.

Figure 11:
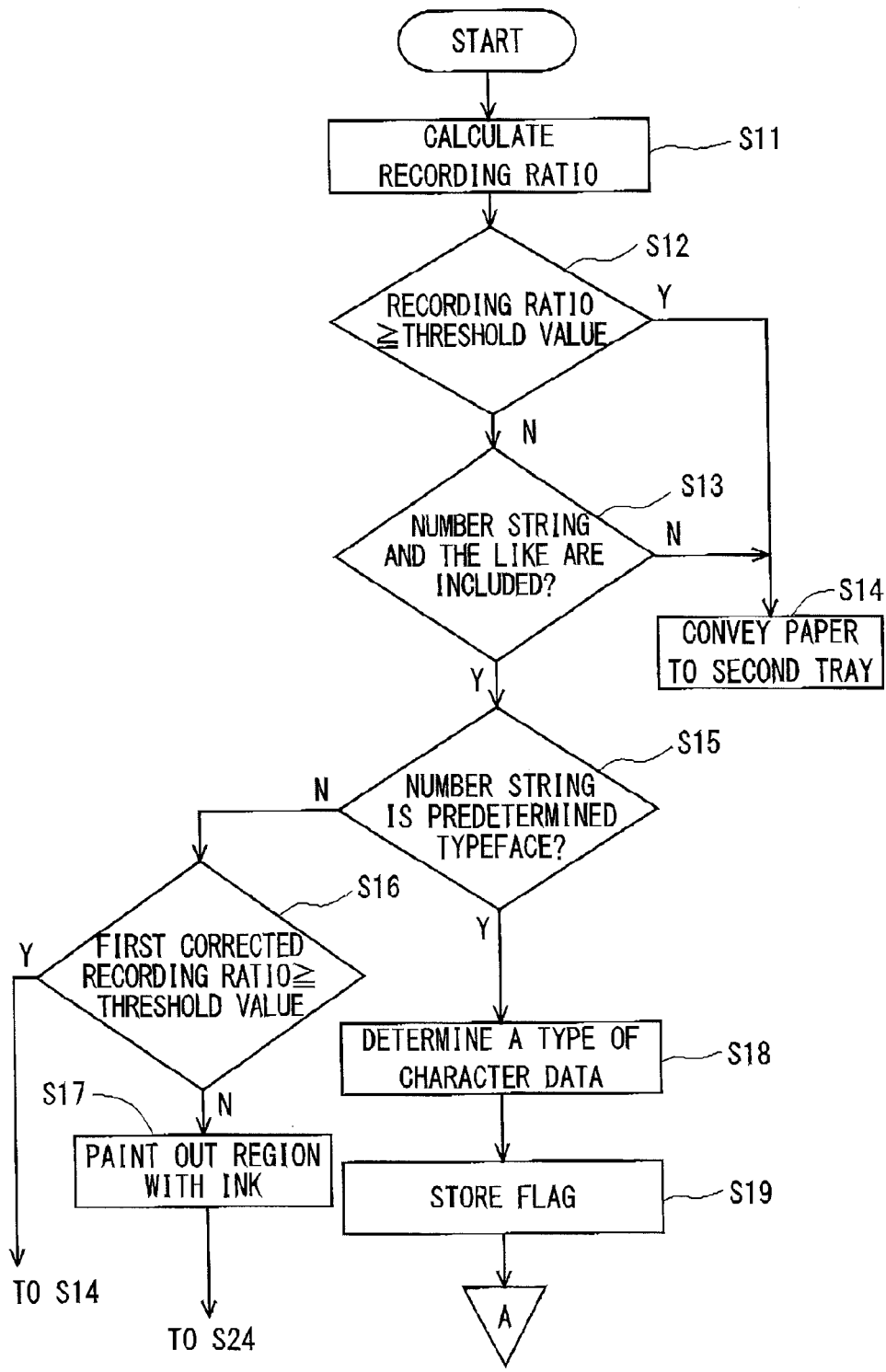
FIG. 11 is a part of a flowchart showing the procedure for determining whether paper should be recycled, according to a second embodiment.
Figure 12:
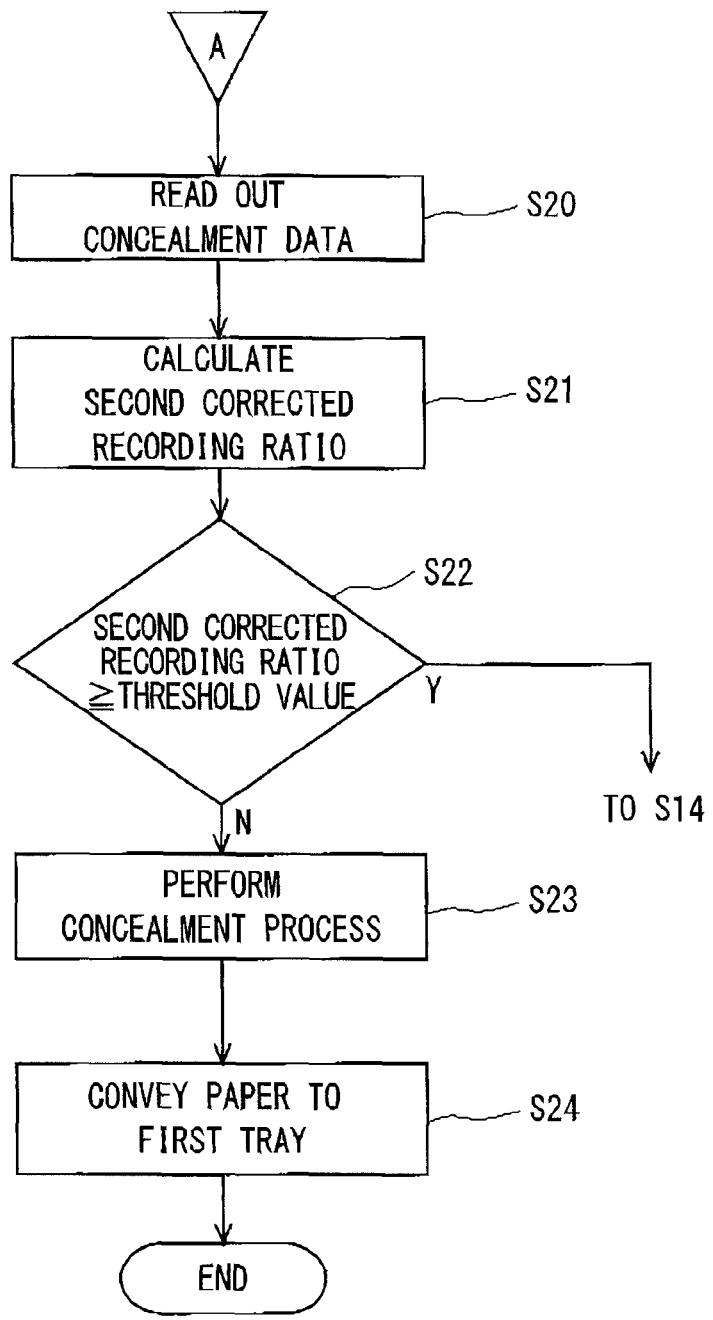
FIG. 12 is a remaining part of the flowchart showing the procedure for determining whether paper should be recycled, according to the second embodiment.

The determination procedure of the second embodiment will be described while referring to FIGS. 11 and 12.

In the following descriptions for the determination procedure, as the concealment process, over personal information included in character, concealment character of the same kind as the personal information read out from the storage device 7 is printed. However, as the concealment process, alternatively, the expansion process may be performed on character to create concealment character, and the concealment character may be printed over the character as described earlier.

In a state where the paper feeding tray 11 accommodates paper P on which character is recorded, the user turns ON the power of the casing 10. The pairs of conveying rollers 90 rotate to convey paper P toward the image reader 5 one sheet at a time. An image of character read by the image reader 5 is temporarily stored in the data memory 30.

The calculating section 3 obtains the total area of ink dots constituting character from an image of character in the data memory 30, and divides the total area of ink dots by the surface area of the recording surface, thereby calculating a recording ratio (S 11). The recording ratio is temporarily stored in the RAM 32.

The controller 2 compares the recording ratio with a threshold value stored in the storage section 31 (S 12). If the recording ratio is greater than or equal to the threshold value, it is inappropriate to recycle the paper P as recycled paper, as described above. Thus, it is inappropriate to perform the concealment process. The controller 2 drives the guide mechanism 61 to convey the paper P to the second tray 60, without driving the depositing devices 4, that is, without performing the concealment process (S 14). At this time, the controller 2 may control the display 13 to display that the concealment process has not been performed.

If the recording ratio is smaller than the threshold value, the controller 2 next determines whether an image of character in the data memory 30 includes a number string corresponding to a telephone number or a post code, an alphabet character string corresponding to a personal name or an address, or an alphabet string including the at mark (@) corresponding to an electronic-mail address (S13).

If the image of the character includes none of the number string, the alphabet character string, and the alphabet string including the at mark, the controller 2 determines that the paper P does not include character to be concealed, and drives the guide mechanism 61 to convey the paper P to the second tray 60, without driving the depositing devices 4, that is, without performing the concealment process (S 14). Cases in which the image of the character does not include a number string etc. encompass, for example, a case in which no number string etc. exists in paper P at all, as well as a case in which a number string etc. does not correspond to a telephone number or a post code obviously, such as a case in which the number string consists of two-digit numbers or the like.

Also, paper P having a recording ratio smaller than the threshold value and having no character to be concealed is recyclable. Thus, the controller 2 may control the display 13 to display a message or the like to that effect. Further, a third tray (not shown) may be provided in addition to the first tray 6 and the second tray 60, and the guide mechanism 61 may be driven so that paper P for which the concealment process is not performed and having a recording ratio smaller than the threshold value is conveyed to the third tray by determining that such paper P is recyclable.

If the image of character includes the number string, the alphabet character string, or the alphabet string including the at mark (S13: Yes), the controller 2 determines whether the number string or the like is printed in Times New Roman typeface or Arial typeface (S15). If the number string or the like is not printed in Times New Roman typeface or Arial typeface (S15: No), the storage device 7 does not have a corresponding dictionary. In this case, the controller 2 controls the image generating section 34 to obtain a region including the number string or the like, and paints out the region with ink. Before doing that, however, the controller 2 obtains the total area of ink dots needed to paint out the number string or the like from the region determined by the image generating section 34, and obtains a value by dividing the total area by the surface area of the recording surface. And, the controller 2 adds this value to the recording ratio of the original character stored in the RAM 32. That is, the controller 2 obtains a recording ratio subsequent to the concealment process in a case where the character is painted out. This recording ratio is referred to as a first corrected recording ratio. The controller 2 determines whether the first corrected recording ratio is greater than or equal to the threshold value (S16).

If the first corrected recording ratio is greater than or equal to the threshold value (S16: Yes), it is inappropriate to perform the concealment process. The controller 2 drives the guide mechanism 61 to convey the paper P to the second tray 60 (S14). At this time, the controller 2 may control the display 13 to display that the concealment process has not been performed.

If the first corrected recording ratio is smaller than the threshold value (S16: No), the controller 2 controls the depositing device 4 to eject ink onto the paper P to paint out the region including the number string or the like with ink (S17). Because it is known beforehand that the first corrected recording ratio is smaller than the threshold value, it is appropriate to recycle the paper P. The controller 2 drives the guide mechanism 61 to convey and accommodate the paper P to the first tray 6 (S24). Before painting out the region including the number string or the like with ink, the controller 2 may control the display 13 to display the region to be painted out in order to inquire of the user whether to paint out the region. The user can input whether to paint out the region from the touch panel 14.

If the number string or the like is printed in Times New Roman typeface or Arial typeface (S 15: Yes), the controller 2 then determines a type of character to be concealed (S18). Specifically, if the image of the character includes a number string, the controller 2 determines whether the number string is a telephone number or a post code based on the number of digits of the number string, the existence of a hyphen in the number string, and the like. If the image of the character includes a alphabet character string, the controller 2 determines whether the alphabet character string is an address or a personal name based on the number of alphabet characters constituting the alphabet character string. If the image of the character includes an alphabet string including an at mark, the controller 2 determines that the alphabet string including the at mark is an electronic-mail address. The controller 2 generates a unique flag that is different depending on the type of the determined personal information, and stores the flag in the RAM 32 (S19).

Further, the controller 2 may control the display 13 to display the number string or the like that is determined to be personal information, and inquire of the user whether to perform the concealment process. The user can operate the touch panel 14 to input to the controller 2 whether to perform the concealment process.

Next, the controller 2 determines the type of personal information to be concealed based on the flag in the RAM 32, and reads out concealment character corresponding to the type from various dictionaries in the storage device 7 (S20). As shown in FIG. 6A, if the personal information is a post code, the controller 2 reads out concealment character corresponding to post codes. Similarly, as shown in FIG. 7A, if the personal information is a personal name, the controller 2 reads out concealment character corresponding to personal names.

Next, the controller 2 sends the concealment character to the image generating section 34 in order to match the concealment character read out from various dictionaries to the size of the personal information to be concealed. The image generating section 34 enlarges or reduces the concealment character so that the size of the concealment character matches the size of the personal information to be concealed, and sends the concealment character to the controller 2.

The controller 2 obtains the total area of ink dots needed to form concealment character on paper P, and obtains a value by dividing the total area by the surface area of the recording surface. And, the controller 2 adds this value to the recording ratio of the original character stored in the RAM 32. That is, the controller 2 obtains a recording ratio subsequent to the concealment process in a case where the concealment character is printed over on the paper P (S21). This recording ratio is referred to as a second corrected recording ratio.

The controller 2 compares the second corrected recording ratio with the threshold value stored in the storage section 31 (S22). If the second corrected recording ratio is greater than or equal to the threshold value (S22: Yes), it is inappropriate to perform the concealment process because it is inappropriate to recycle the paper P as recycled paper as described above. The controller 2 drives the guide mechanism 61 to convey the paper P to the second tray 60 (S14). At this time, the controller 2 may control the display 13 to display that the concealment process has not been performed.

If the second corrected recording ratio is smaller than the threshold value (S22: No), the controller 2 controls the depositing device 4 to eject ink onto paper P to print concealment character read out from various dictionaries over personal information in the character on the paper P. That is, the concealment process is performed (S23). Because it is known beforehand that the second corrected recording ratio is smaller than the threshold value, it is appropriate to recycle the paper P. The controller 2 drives the guide mechanism 61 to convey and accommodate the paper P to the first tray 6 (S24).

Note that, before ejecting ink onto the paper P, the controller 2 may control the display 13 to display an image in which concealment character is printed over character, in order to inquire of the user whether to perform the concealment process. The user can operate the touch panel 14 to input to the controller 2 whether to perform the concealment process.

In the second embodiment, if character in paper P includes personal information, it is conceivable that the concealment process is performed on the entirety of the character on the recording surface. In this case, however, the concealment process takes time. In addition, the amount of ink ejected by the depositing device 4 increases, which leads to a cost increase. Accordingly, the recording apparatus 1 of the present embodiment determines whether to perform the concealment process only on a partial region of character, thereby reducing time and effort required for the concealment process.

The second tray 60 accommodates paper P having a recording ratio that is greater than or equal to the threshold value. Because such paper P cannot be recycled, as indicated by the solid lines in FIGS. 3A and 3B, a shredder 68 for shredding paper P may be detachably attached to the second tray 60. In this case, a roller 69 is disposed in the second tray 60 for conveying paper P from the second tray 60 to the shredder 68. By shredding paper P, it is possible to prevent a situation that personal information included in character on paper P for which the concealment process has not been performed leaks to the outside.

Figure 13:
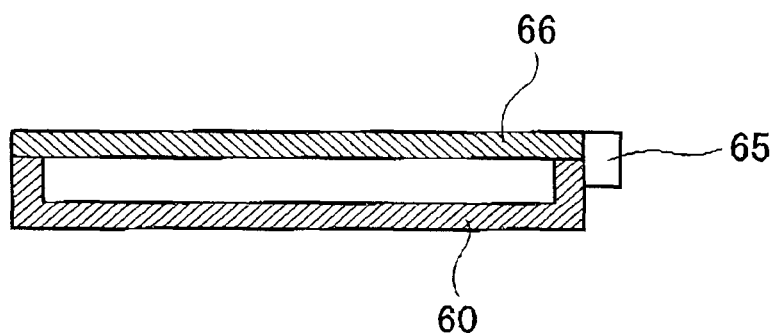
FIG. 13 is a cross-sectional view showing a lock mechanism of a second tray.

Further, the second tray 60 accommodates paper P for which the concealment process has not been performed. That is, personal information included in character on the paper P is not concealed. In this case, there is a possibility that the paper P is taken out from the second tray 60 inadvertently. In order to prevent this possibility, as shown in FIG. 13, a lid 66 may be provided over the second tray 60, and a lock mechanism 65 with a lock key may also be provided for preventing the lid 66 from being easily detached from the second tray 60. As the lock key of the lock mechanism 65, known technology such as a mechanical cylinder lock, a card key, a fingerprint authentication key, and the like could be used.

The recording apparatus 1 of the above-described first and second embodiments has the following advantages.

(1) The controller 2 determines whether to perform the concealment process for an image, based on whether the recording ratio of an image recorded on paper P is smaller than a predetermined threshold value. That is, if the recording ratio of the image is greater than or equal to the predetermined value, the controller 2 determines that paper P for which the concealment process has been performed cannot be recycled, because it is conceived that an image for which the concealment process is to be performed occupies a major part of the recording surface. On the other hand, if the recording ratio of the image is smaller than the predetermined value, the controller 2 determines that paper P is recyclable even if the concealment process is performed. Thus, a determination can be made appropriately whether to recycle paper P for which the concealment process has been performed.

(2) In the recording apparatus 1, different trays are used for accommodating paper P depending on whether the concealment process is performed. With this configuration, the user can easily differentiate paper P to be recycled from paper P that cannot be recycled.

Modifications

While the invention has been described in detail with reference to the above aspects thereof, it would be apparent to those skilled in the art that various changes and modifications may be made therein without departing from the scope of the claims.

For example, in the above-described embodiments, confidential information included in character is concealed. However, a certain graphic data may be concealed. For example, a two-dimensional code such as a bar code may be processed as confidential information to be concealed. Information such as the two-dimensional code sometimes includes confidential information. Hence, by performing the concealment process, leakage of the confidential information can be prevented.

What is claimed is:

1. A recording apparatus comprising:
a conveying-path defining member defining a conveying path along which a recording medium is conveyed;
an image reader provided to face the conveying path and configured to read image recorded on the recording medium;
a depositing device provided to face the conveying path at a downstream side of the image reader in the conveying path, the depositing device being configured to deposit recording material on the recording medium;
a controller configured to control the image reader and the depositing device;
a first memory storing a predetermined threshold value; and
a second memory storing instructions, when executed by the controller, causing the controller to perform:
calculating at least one of a first recording ratio and a second recording ratio based on image data based on the image read by the image reader, the first recording ratio being an occupancy ratio of an area of recording material forming the image to a surface area of the recording medium, the second recording ratio being the occupancy ratio assuming that the recording material is deposited as a result of a concealment process based on the image data, the concealment process being a process of depositing the recording material over at least part of the image recorded on the recording medium;
comparing at least one of the first recording ratio and the second recording ratio with the threshold value;

controlling the depositing device to perform the concealment process when at least one condition is satisfied, the at least one condition including a condition that the at least one of the first recording ratio and the second recording ratio is smaller than the threshold value; and controlling the depositing device not to perform the concealment process when the at least one of the first recording ratio and the second recording ratio is greater than or equal to the threshold value.

2. The recording apparatus according to claim 1, wherein the second memory further stores instructions, when executed by the controller, causing the controller to perform:
determining a region for which concealment is needed, the region being a part of the image; and
controlling the depositing device to perform the concealment process on the region.

3. The recording apparatus according to claim 1, wherein the image reader comprises a plurality of image readers arranged to confront each other with the conveying path interposed therebetween, the plurality of image readers being configured to read images recorded on both sides of the recording medium.

4. The recording apparatus according to claim 1, further comprising:
a first tray and a second tray provided at a downstream side of the depositing device in the conveying path; and
a guide mechanism disposed between the depositing device and the first tray and the second tray, the guide mechanism being configured to guide the recording medium conveyed along the conveying path to one of the first tray and the second tray,
wherein the second memory further stores instructions, when executed by the controller, causing the controller to perform controlling the guide mechanism to guide the recording medium for which the concealment process is performed to the first tray and to guide the recording medium for which the concealment process is not performed to the second tray.

5. The recording apparatus according to claim 4, further comprising a lock mechanism that is provided at the second tray, the lock mechanism being configured to prevent the recording medium from being taken out of the second tray.

6. The recording apparatus according to claim 1, wherein the second memory further stores instructions, when executed by the controller, causing the controller to perform controlling the depositing device to deposit recording material on the recording medium in accordance with the image data based on the image read by the image reader, thereby recording an image on the recording medium.

7. The recording apparatus according to claim 1, wherein the concealment process includes a process of depositing the printing material over at least one character that is recorded on a recording surface of the recording medium.

8. The recording apparatus according to claim 7, further comprising:
a third memory storing at least one dictionary including the concealment data corresponding to a type of confidential information,
wherein the second memory further stores instructions, when executed by the controller, causing the controller to perform:
comparing character data based on the at least one character recorded on a recording surface with the concealment data in the at least one dictionary;
when the character data matches one of the concealment data in one of the at least one dictionary, reading out at least one data that is randomly selected from the one of the dictionary; and
controlling the depositing device to print at least one character based on the at least one data over the at least one character recorded on a recording surface.

9. The recording apparatus according to claim 8, wherein the second memory further stores instructions, when executed by the controller, causing the controller to perform:
generating specific concealment data that is shifted from original character data in a line direction in which a character string of the original character data is arranged; and
controlling the depositing device to print at least one character based on the specific concealment data over the at least one character recorded on a recording surface.

10. The recording apparatus according to claim 8, wherein the confidential information includes personal information relating to a person; and
wherein the type of the at least one dictionary includes at least one of postcodes, addresses, personal names, electronic-mail addresses, and telephone numbers.

11. The recording apparatus according to claim 8, wherein the second memory further stores instructions, when executed by the controller, causing the controller to perform controlling the depositing device to paint out the character with recording material when a typeface of the character data is other than a predetermined typeface.

12. The recording apparatus according to claim 1, wherein the concealment process includes a process of randomly extracting a specific pixel constituting the at least one character and of painting pixels located around the specific pixel.

13. The recording apparatus according to claim 4, further comprising a shredder provided detachably at the second tray and configured to shred the recording medium.

14. A non-transitory computer readable medium storing a set of program instructions, the instructions, when executed by a controller of a recording apparatus, causing the controller to perform:
calculating at least one of a first recording ratio and a second recording ratio based on image data based on an image read by an image reader of the recording apparatus, the first recording ratio being an occupancy ratio of an area of recording material forming the image to a surface area of the recording medium, the second recording ratio being the occupancy ratio assuming that the recording material is deposited as a result of a concealment process based on the image data, the concealment process being a process of depositing the recording material over at least part of the image recorded on the recording medium;
comparing at least one of the first recording ratio and the second recording ratio with a threshold value;
controlling a depositing device of the recording apparatus to perform the concealment process when at least one condition is satisfied, the at least one condition including a condition that the at least one of the first recording ratio and the second recording ratio is smaller than the threshold value; and
controlling the depositing device not to perform the concealment process when the at least one of the first recording ratio and the second recording ratio is greater than or equal to the threshold value.

15. A method of concealing an image recorded on a recording medium, the method comprising:

calculating at least one of a first recording ratio and a second recording ratio based on image data based on an image read by an image reader of a recording apparatus, the first recording ratio being an occupancy ratio of an area of recording material forming the image to a surface area of the recording medium, the second recording ratio being the occupancy ratio assuming that the recording material is deposited as a result of a concealment process based on the image data, the concealment process being a process of depositing the recording material over at least part of the image recorded on the recording medium;

comparing at least one of the first recording ratio and the second recording ratio with a threshold value;

controlling a depositing device of the recording apparatus to perform the concealment process when at least one condition is satisfied, the at least one condition including a condition that the at least one of the first recording ratio and the second recording ratio is smaller than the threshold value; and controlling the depositing device not to perform the concealment process when the at least one of the first recording ratio and the second recording ratio is greater than or equal to the threshold value.

\* \* \* \* \*